United States Patent [19]
Janssen

[11] 4,354,178
[45] Oct. 12, 1982

[54] ELECTRODYNAMIC BALANCE FOR A DETECTION

[76] Inventor: Lambert R. Janssen, 262 Ave. F. Roosevelt B.10, 1050 Brussels, Belgium

[21] Appl. No.: 86,482

[22] Filed: Oct. 19, 1979

[30] Foreign Application Priority Data

Oct. 26, 1979 [BE] Belgium ................................. 46650

[51] Int. Cl.³ ............................................ G08B 13/18
[52] U.S. Cl. .................................. 340/572; 340/515; 340/551; 340/552
[58] Field of Search ............... 340/551, 572, 380, 515, 340/525, 552

[56] References Cited

U.S. PATENT DOCUMENTS

| | | | |
|---|---|---|---|
| 3,493,955 | 2/1970 | Minasu | 340/572 |
| 3,652,928 | 3/1972 | Mansfield | 340/515 |
| 3,686,564 | 8/1972 | Mallick, Jr. et al. | 340/551 |
| 4,012,690 | 3/1977 | Heytow | 340/552 |
| 4,118,693 | 10/1978 | Novikoff | 340/572 |
| 4,223,302 | 9/1980 | Hocking | 340/525 |

*Primary Examiner*—Glen R. Swann, III
*Attorney, Agent, or Firm*—Martin A. Farber

[57] ABSTRACT

A balance system detects ferrous or non-ferrous metallic objects carried by people or present in certain articles. This balance consists in the generation of a fixed oblique magnetic field of detection, substantially constant, whatever the orientation or positioning of the objects to be detected in the search area. The balance in combination with a search gate, includes a transmitting coil and a receiving coil, each having an L-shape, inverted relative to each other.

4 Claims, 1 Drawing Figure

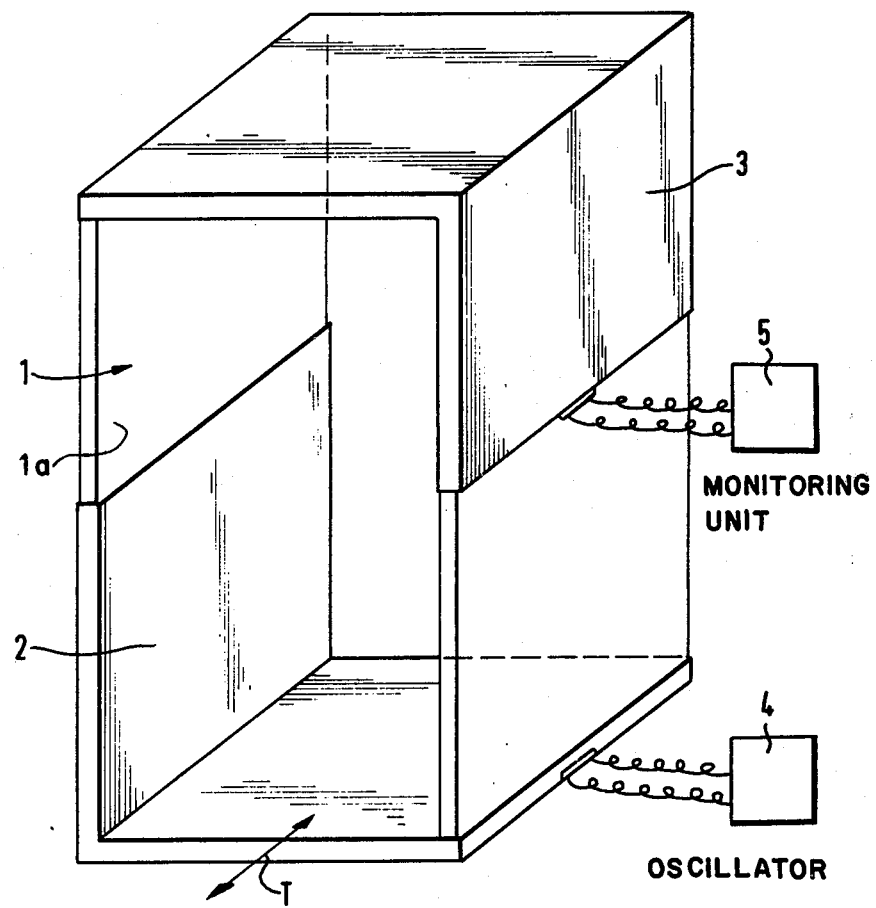

ELECTRODYNAMIC BALANCE FOR A DETECTION

BACKGROUND OF THE INVENTION

The present invention is related to an electromagnetic balance for a system of detecting ferrous or non-ferrous metallic objects, particularly suitable against theft, either as an integral or random search, of workmen or employees leaving a factory or a store, for the protection of books, records or museum artifacts by the insertion of metallic snares in documents, for the search of visitors in embassies, banks, fairs or various demonstrations, for the search of air passengers before boarding aircraft in airports, for the search of prisoners and visitors in prisons or, for the inspection of mail or packages which could be booby trapped.

Such a system is suitable also for industrial applications, for example in the textile industry for detecting small metallic objects in wool before carding, in quarries for detecting undesirable metallic objects on conveyor belts above a crushing-mill, in nuclear industries against theft or also in pediatrics or veterinary medicine for diagnosing the absorption of metallic objects, this list being given by example only and not in a limiting sense.

SUMMARY OF THE INVENTION

The electrodynamic detection system according to the invention, comprises means for generating a fixed oblique magnetic field of detection, substantially constant, whatever the orientation or positioning of the objects to be detected in the search area.

According to the invention this electrodynamic balance for a detection system, combined into a search gate, is composed of an electromagnetic balance adjusted on location according to the environment, and includes a transmitting coil, and a receiving coil, the latter being connected to a monitoring unit including a power supply unit, visual evaluation unit, relay unit, and amplification unit.

The presence of ferrous metallic objects in the oblique magnetic field which is created increases the coupling between the coils, while non-ferrous metallic objects create eddy currents and decrease the coupling between the coils.

The arrangement of the coils in "L" shape permits a concentration of the magnetic field avoiding losses of the magnetic flux outside the detecting zone of the gate.

BRIEF DESCRIPTION OF THE DRAWING

To facilitate the understanding of the invention, it is now described on the basis of a schematic drawing as an example only, showing a search gate including the electrodynamic balance for a detection system according to the invention.

DESCRIPTION OF THE PREFERRED EMBODIMENT

As shown by a drawing the search gate 1 is constituted by a form allowing easy traversal by people or objects, the traffic flowing according to the direction of the arrow "T". The gate 1 is designed to avoid any claustrophobic effect.

The coils of the transmitting loop 2 and receiving loop 3 have an "L" shape and are embedded in a gate frame 1a, inclined diagonally opposite each other with respect to the direction of the traffic, in order to create a fixed oblique magnetic field of detection.

The geometry of the loops ensures a field of detection practically constant in the search area, whatever the orientation or tfhe positioning of the objects to be detected. The coils of the transmitting loop 2 are connected to an oscillator 4, interdependent or not of the gate; the coils of the receiving loop 3 are connected to the monitoring unit 5 via a multiconnector.

A control system (not shown) is provided in the installation. Thus, a test loop coupled to a potentiometer permits one to check the satisfactory operating status of the entire system by the use of a test switch.

The electronics of the system are composed of several plug-in type modular printed boards easily interchangeable. Circuits are fully equipped with I.C. and transistors for easy of servicing. The oscillator operates at an audible frequency.

Traffic signals with "red"—alarm— and "green"—go— may be installed at various locations on the system.

The monitoring unit 5 includes a power supply unit, visual unit, relay unit, and an AC/DC amplification unit.

a. For example, a row of lights on the monitoring unit gives an indication of the metallic load detected and indicates the presence of ferrous or non-ferrous metals detected. These lamps may have a different color for ferrous or non-ferrous metals. A digital display or an ammeter, indicating the load and the nature of the metals detected, may replace those lights.

b. The "alarm" module simultaneously triggers an indicator, for example on the monitoring unit, turns on the alarm traffic signals and a buzzer, which for instance, gives a continuing sound in the case of ferrous metals, and a modulated sound for non-ferrous ones. After an alarm, the re-setting is automatic.

It is possible to increase the sensitivity of the system by a key switch or another device. The supersensitivity condition is indicated by a light. A first light indicates the power "on" condition of the system and a second one indicates the operating readiness.

The amplification module is made of selective type amplifiers. Relay outputs are provided for optional peripheral usage such as camera control, traffic or alarm counters, door locking devices, alarm horns, etc.

The monitoring units are interchangeable from gate to gate, without prior adjustment, and are operational within seconds.

The electromagnetic system of detection according to the invention is not influenced by RF, VHF, or UHF transmitters such as radar, transceivers, etc.

I claim:

1. An electrodynamic balance for systems of detection of ferrous or non-ferrous metallic objects having a gate frame defining a direction of advance for the objects to pass therethrough, comprising
   a first loop means for transmitting electromagnetic waves,
   a second loop means for receiving said electromagnetic waves,
   both said loop means being cooperatively mounted diagonally opposite each other on said gate frame for creating a fixed magnetic field which is oblique transversely to said direction of advance and which is substantially constant at each point, respectively, between both said loop means under any orientation and position, respectively, of the objects in the magnetic field, wherein the gate frame is three-dimensionally rectangular, each of said loop means is formed in an L-shape and has a vertex, said vertices facing away from each other, said loop means are inverted relative to each other and one of said loop means is higher than the other and said loop means are disposed in diagonally opposite corners of the gate frame.

2. The electrodynamic balance according to claim 1, wherein said gate frame and said loop means constitute a search gate.

3. The electrodynamic balance according to claim 1, further comprising an oscillator operatively connected to said first loop means.

4. The electrodynamic balance according to claim 1, wherein each of said loop means has two sides forming said L-shape, one of said sides of each of said loop means, respectively, extends completely over a top and bottom side of said gate frame, respectively, and the other of said sides of each of said loop means respectively extends vertically only to substantially a center of a respective side of said gate frame.

* * * * *